Sept. 15, 1936.    R. E. MANLEY ET AL    2,054,774
TREATMENT OF HYDROCARBON OILS
Filed June 13, 1932
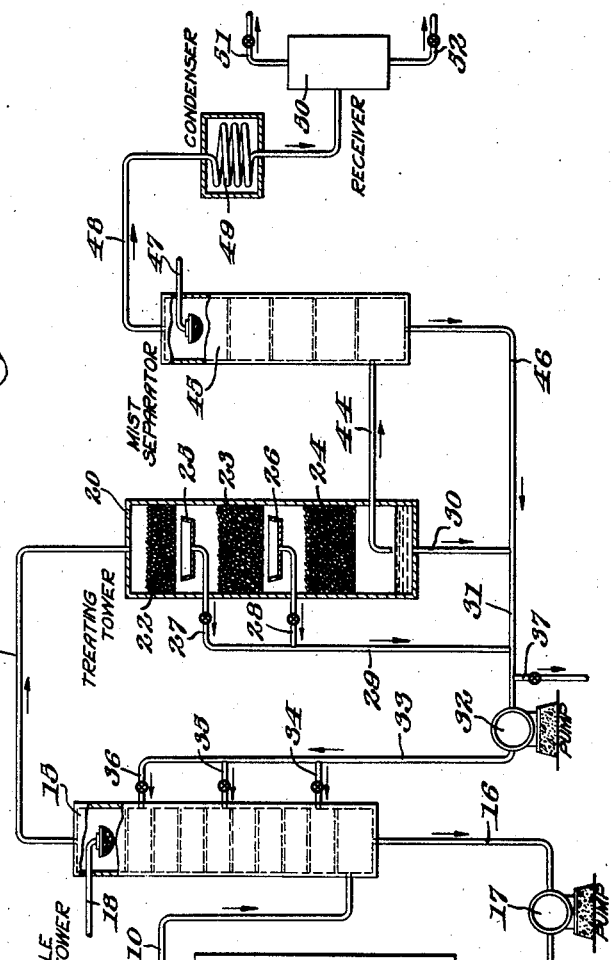
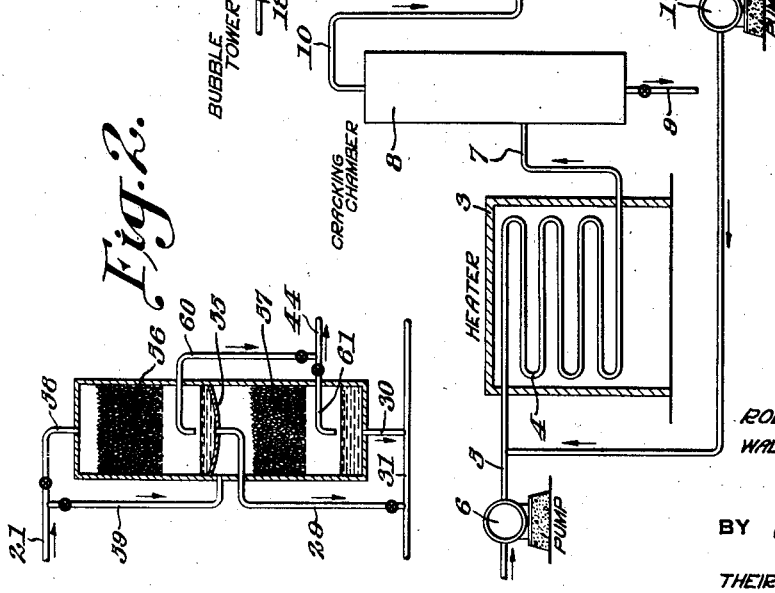
ROBERT E. MANLEY
AND
WALTER ULLRICH
INVENTOR
BY R. J. Dearborn
THEIR ATTORNEY Patented Sept. 15, 1936

2,054,774

UNITED STATES PATENT OFFICE 2,054,774

TREATMENT OF HYDROCARBON OILS

Robert E. Manley and Walter Ullrich, Beacon, N. Y., assignors to The Texas Company, New York, N. Y., a corporation of Delaware Application June 13, 1932, Serial No. 616,864

2 Claims. (Cl. 196—96)

This invention relates to the treatment of hydrocarbon oils and more particularly to the treatment of volatile hydrocarbons, such as cracked naphthas and the like which may contain unstable, unsaturated compounds.

An object of the invention is to treat hydrocarbon oils containing unstable cracked constituents with a solid catalytic adsorbent material to obtain a highly refined oil which is stable as to color and gum.

An important object of the invention is to provide a method for refining cracked naphthas by filtration through a highly active catalytic adsorptive material to obtain a superior stable gasoline without substantial loss of anti-knock property and to remove the unstable, unsaturated compounds.

Valuable synthetic lubricating oils may be obtained in the use of the invention as a result of the polymerization of the unstable unsaturated constituents of the hydrocarbons treated.

Cracked hydrocarbon oils, such as cracked gasoline or naphtha, particularly those resulting from vapor phase cracking, contain unsaturated constituents which are often of bad color, bad odor and tend to form polymers or gum on standing. A common method of refining such cracked oils is by passage of the vapors through an adsorptive catalyst, such as fuller's earth. It has been customary in the past to use for this purpose low power, relatively coarse clays, such as 30–60 or 60–90 mesh fuller's earth or equivalent materials, which may partially remove the more reactive unsaturated compounds as polymers which may be of the nature of gas oil and the like, suitable for charging stocks to cracking stills.

Instead of using relatively coarse low power adsorptive catalyst, such as ordinary fuller's earth, we use in our process what are commonly known as "high power" catalytic clays. These catalytic materials ordinarily have been used, heretofore, in contact filtration operations wherein the finely divided clay is agitated, for example, with lubricating oil at an elevated temperature and have the peculiar property of exhibiting their maximum decolorizing effect on lubricating oils at temperatures much higher than the optimum temperature when using ordinary fuller's earth, usually above about 250° F. A catalytic agent particularly suited for this purpose is of the type produced by acid treating certain clays, for example, those of the bentonite or montmorillonite type, as disclosed in U. S. Patent No. 1,642,871, September 20, 1927, to Chappell et al. There are some naturally occurring "high power" clays including natural earths or clays from certain localities as well as artificial materials manufactured by treating substances by physical or chemical means, or by fusing silica with magnesia or other alkaline materials, and these are intended to be included within the scope of this invention. All of the foregoing materials are preferably of relatively fine mesh, for example, in excess of 100 mesh and usually 50–100% finer than 200 mesh.

According to the present invention, the hydrocarbons to be treated, together with higher or lower boiling constituents are passed, essentially in the vapor phase, through a chamber containing the catalyst. The vapors are passed through a bed of the catalyst and in passing therethrough, the more unstable, unsaturated compounds are polymerized to higher boiling constituents. It is usually advantageous to maintain the temperature of the bed of catalytic material such that a sufficient quantity of vapor is condensed so that the condensate acts as a solvent and has a beneficial washing effect in removing foreign material, such as polymers and the like, which tend to be held in the bed of catalyst and reduce the efficiency thereof.

In the accompanying drawing, there is shown diagrammatically an apparatus for treating hydrocarbons in accordance with the invention.

In the drawing, Figure 1 is an illustration, partly in section, of an apparatus which may be employed in connection with the invention.

Figure 2 is a view in vertical section of a modified form of a catalyst container or treating tower which may be substituted for the one shown in the apparatus of Figure 1.

Referring more particularly to the drawing, the numeral 3 represents a heater or furnace in which is located a tube or coil 4 of a cracking still. Oil is supplied to the coil through a charge line 5 by a pump 6. In the coil, the oil is raised to the desired temperature and then transferred through line 7 to a cracking chamber or reaction vessel 8 from which the unvaporized residue may be withdrawn through a valve-controlled line 9. The cracking still is shown as a conventional tube and vertical still design but it will be understood that any well known or preferred type of cracking unit or rerun still may be used to provide a source of vapors which are to be treated as hereinafter described.

The vapors from the cracking chamber 8 are conducted through a vapor line 10 to a bubble or any other well known type of fractionating tower 15 wherein the vapors are fractionated to separate the higher boiling constituents as reflux condensate which is collected in the bottom of the tower and returned to the cracking coil by means of the line 16 and pump 17. A reflux or cooling medium, such as fresh charging stock, water, or other suitable fluid may be introduced to the top of the fractionating tower through the spray pipe 18. The vapors from the bubble tower are conducted to a treating tower 20, by a line 21, where the vapors pass through the catalyst. The catalyst is shown preferably divided into a series of beds 22, 23 and 24 but this is not essential since the catalyst may be all in a single bed. During the passage of the vapors through the catalyst, the more unstable constituents of the vapors are polymerized to higher boiling compounds which will condense along with a certain amount of the higher boiling constituents of the vapors, the latter condensate serving as a solvent for washing out the polymers from the catalyst.

To facilitate the removal of the solution of polymers and condensate, pans 25 and 26 are provided for collecting the liquids drained from the uppermost beds 22 and 23, respectively. The liquids collected in the pans are withdrawn through valve-controlled pipes 27 and 28 which are in communication with a line 29. The liquids from the lowermost bed of catalyst 24 are collected in the bottom of the tower and are withdrawn through line 30. The polymers and condensates withdrawn from the beds of catalyst through lines 29 and 30 are combined in a line 31 where they are picked up by a pump 32 and forced through a line 33 to the fractionating tower. The line 33 communicates with the bubble tower 15 by a plurality of branched pipes 34, 35 and 36 whereby the liquids forced through the line 33 may be introduced at one or more levels into the fractionating tower. However, any or all of the condensates from the treating tower may be withdrawn from the system through a line 37 and may be used for the manufacture of synthetic lubricating oils or otherwise disposed of.

The vapors from the treating tower are passed through a line 44 to a mist separator 45. In the mist separator, the entrained liquids and other materials of higher boiling points than the desired motor fuel are separated from the vapors and withdrawn from the bottom of the separator through a line 46 to be returned preferably to the bubble tower. A reflux or scrubbing medium may be introduced into the top of the mist separator through a spray pipe 47. The purified vapors from the mist separator are conducted through a line 48 to a final condenser coil 49 wherein the motor fuel constituents are condensed, after which separation of the condensate and fixed gases is accomplished in the receiving drum 50, the latter being equipped with the usual gas release line 51 and liquid draw-off line 52.

In Figure 2, the treating tower is shown divided into two sections with a partition 55 therebetween. Separate beds, 56 and 57, of catalyst are located in the upper and lower sections of the tower, respectively. The vapor pipe 21 from the bubble tower, in this case, terminates in branches 58 and 59 so that the stream of vapors may be split and passed in parallel through the two beds of catalyst. Liquids separated from each clay bed may be withdrawn through lines 29 and 30 while the treated vapors from each section of the tower are withdrawn through lines 60 and 61 which merge into the vapor line 44 leading to the mist separator. By the arrangement shown in Figure 2 the area of catalyst through which the vapors must pass for a given total throughout is greatly reduced as compared with the tower shown in Figure 1. This is of considerable advantage when it is undesirable to maintain high pressures during the treating operation inasmuch as the back-pressure of a large bed of catalyst is often quite high. Accordingly, when treating vapors from a source which provides a relatively low pressure, such as rerun stills or pressure coke stills wherein the operation is conducted under approximately 75 lbs. per sq. in. or less, the arrangement shown in Figure 2 is of great advantage. It will be appreciated, of course, that any number of beds of catalyst or towers may be connected in parallel.

A further method, which is quite effective in reducing the back-pressure of the bed of catalyst, according to the invention, is to mix uniformly with the catalyst a suitable amount of filter aid material. Materials which may be used for this purpose are any of the commercial filter aids, such as filter cel, kieselguhr, etc. We prefer, therefore, to mix about 5-25% by weight of filter aid with the catalyst, depending on the depth of the filter bed. It will be observed that the presence of the filter aid, in addition to reducing the back-pressure, will also effect better drainage of the polymers and permit deeper beds of catalyst to be used. But a particular advantage is the fact that periodical steaming of the bed to recondition the catalyst, as described hereinafter, is greatly facilitated in that the catalyst will have less tendency to mud up and pack together.

When practicing the invention, it has been found that the catalyst noticeably decreases in efficiency after long periods of continuous operation. It is economically undesirable to discard the spent clay and use a new batch when this occurs. Therefore, we prefer to periodically revivify or to recondition the material. This may be done by intermittently discontinuing the treating operation and steaming the catalyst in situ. The undesirable material, such as certain polymers which tend to accumulate in and be retained by the clay, are readily discharged by the steam whereby the clay is substantially revitalized. In order to avoid shutting down the treating operation during the steaming periods, it is often advantageous to provide two or more treating towers or chambers so that the one to be reconditioned may be temporarily by-passed during the reconditioning operation and the other used.

In the operation of our process, pressures and temperatures may vary and it is to be understood that with high pressures, high temperatures will necessarily prevail in order to maintain the oil in vapor form; but the temperatures should not exceed cracking temperatures.

Obviously, many modifications and variations of the invention, as hereinbefore set forth, may be made without departing from the spirit and scope thereof, and therefore only such limitations should be imposed as are indicated in the appended claims.

We claim:

1. In the process of refining cracked naphthas and the like wherein vapors of the same are passed through a solid adsorbent material at a temperature not above the normal vaporizing temperature of the hydrocarbons to be purified, thereby polymerizing unstable unsaturated constituents, the improvement which consists in passing the vapors to be refined through a bed of acid treated clay of the montmorillonite type and characterized by having 50-100% thereof finer than 200 mesh, whereby more extensive polymerization of undesirable unsaturated constituents occurs than normally takes place with ordinary fuller's earth.

2. The process of refining a cracked hydrocarbon distillate, which comprises fractionating cracked vapors to obtain a fraction comprising principally motor-fuel constituents but containing unstable unsaturated constituents undesired in the final motor fuel product, and subsequently passing said fraction in vapor form without preheating through a bed of solid adsorbent material to effect a polymerization of said unstable unsaturated constituents to compounds of higher boiling point than the desired motor fuel product, said adsorbent material consisting of an acid-treated montmorillonite-type clay of which at least 50 per cent is finer than 200 mesh, and having admixed therewith a sufficient proportion of relatively coarse filter-aid material, whereby the resistance of said bed to the flow of vapors is materially reduced.

ROBERT E. MANLEY.
WALTER ULLRICH.